United States Patent [19]

Davidge et al.

[11] 4,429,051

[45] Jan. 31, 1984

[54] CERAMIC MATERIALS BY SOL-GEL ROUTE

[75] Inventors: Roger W. Davidge, Wantage; James L. Woodhead, Didcot, both of England

[73] Assignee: United Kingdom Atomic Energy Authority, London, England

[21] Appl. No.: 356,511

[22] Filed: Mar. 9, 1982

[30] Foreign Application Priority Data

Mar. 11, 1981 [GB] United Kingdom ............... 8107701

[51] Int. Cl.³ .............................................. C04B 35/02
[52] U.S. Cl. ...................................... 501/12; 264/13; 501/94; 501/105; 501/127
[58] Field of Search .................. 501/12, 94, 105, 127; 264/13

[56] References Cited

U.S. PATENT DOCUMENTS

| | | | |
|---|---|---|---|
| 3,518,050 | 6/1970 | Woodhead | 423/397 |
| 3,704,147 | 11/1972 | Hardy et al. | 501/100 X |
| 3,862,908 | 1/1975 | Fitch et al. | 501/103 X |
| 4,218,253 | 8/1980 | Dworak et al. | 501/89 |
| 4,298,385 | 11/1981 | Claussen | 501/105 |
| 4,314,827 | 2/1982 | Leitheiser et al. | 51/309 |
| 4,316,964 | 2/1982 | Lange | 501/105 |
| 4,331,048 | 5/1982 | Dworak et al. | 501/105 X |

FOREIGN PATENT DOCUMENTS

| | | | |
|---|---|---|---|
| 1282307 | 7/1972 | United Kingdom | 252/62.62 |
| 1567003 | 5/1980 | United Kingdom . | |

OTHER PUBLICATIONS

Rieth, P. H. et al., "Fabrication and Flexural Strength of Ultrafine-grained Yttria-Stabilized Zirconia", Cer Bull 55 (8), Aug. 1976, pp. 717–721, 727.

Palmour, H. et al., Processing of Crystalline Ceramics, Plenum Press, NYC, (1978).

"Ceramics Sintered Directly from Sol-Gels", by Becher, P. F. et al., pp. 79–85, Materials Science Research, vol. 11.

*Primary Examiner*—Helen M. McCarthy
*Attorney, Agent, or Firm*—Larson and Taylor

[57] ABSTRACT

Sintered materials are known comprising a ceramic matrix (e.g. of $Al_2O_3$) and, distributed therein, a refractory material in a metastable, high temperature enantiotropic form of higher density than its room temperature enantiotropic form such as $ZrO_2$ which has a metastable tetragonal form and a room temperature monoclinic form. The sintered materials have enhanced fracture and bending strength.

The invention provides a method of making such materials from a mixture where the refractory material and optionally the ceramic material are in the form of a sol. The mixture is dried and subsequently sintered to give a product where the refractory material is distributed very uniformly and in its metastable form. Improved properties have been obtained by including a stabilizing agent (e.g. $Y_2O_3$) in the final product.

5 Claims, No Drawings

CERAMIC MATERIALS BY SOL-GEL ROUTE

This invention relates to the preparation of sintered ceramic materials having enhanced mechanical properties.

The specification of UK Patent Application No 2 007 641A described a sintered material comprising a ceramic matrix, e.g. of a carbide, nitride, boride or oxide such as $Al_2O_3$, and a refractory material uniformly distributed in the matrix. The refractory material has a mean particle size of from 0.05 to 2 micrometers and is present in a metastable, high temperature enantiotropic form of higher density than its room temperature enantiotropic form. Examples of such a refractory material include $ZrO_2$ and/or $HfO_2$ which are capable of existing in a metastable tetragonal form and in a room temperature monoclinic form. The sintered materials are stated to retain high fracture strength and to have increased bending strength in comparison with previously known materials. The increase is stated to be due to the fact that, when the refractory material is $ZrO_2$, when tetragonal $ZrO_2$ is subject to stress, "there results a phase conversion into the monoclinic form which results in dissipation of the strains".

The above specification also describes the preparation of such sintered material by sintering a composition comprising a particulate ceramic starting material and a refractory material uniformly distributed in the ceramic starting material. The refractory material is stated to have a lower average particle size limit of 0.01 micrometers and all examples given require the use of the refractory material in powder form.

The present invention is concerned with the preparation of sintered ceramic materials using colloidal particles of a precursor for the refractory material in the form of a sol thereof. Thus, the present invention provides a method of preparing a sintered ceramic material in which a refractory material is present in a metastable, high temperature enantiotropic form in a ceramic matrix, the metastable form having a higher density than its room temperature enantiotropic form, which method comprises the steps of:

(i) drying a homogeneous mixture of a particulate ceramic matrix material and a sol comprising colloidal particles of a refractory material precursor dispersed in a liquid medium, and (ii) sintering the dried mixture to give the ceramic material.

By "refractory material precursor" is meant a material which is convertible to the refractory material as such after step (i) has been completed, for example during step (ii) or during an intermediate heating step, if carried out. Such a precursor may be for example comprise a hydrated form of the refractory material and it might be expected that conversion of precursor to refractory material would give rise to undesirable shrinkage effects. It has however been found that the present invention may give rise to a product having very desirable properties such as good bend strength and fracture toughness, as will be illustrated in the examples of this specification. Also, the refractory material has been found to be dispersed very uniformly in the product and to be present predominantly in its metastable form.

The ceramic matrix material is preferably a refractory oxide such as alumina though it may, for example, be a carbide, nitride or boride. Typically, the ceramic matrix material may constitute from 50% by weight upwards of the final product. Also it should have a fine grain size, for example of the order of a few micrometers. The ceramic matrix material may contain small amounts of incidental constituents. For example, some commercially available aluminas which may be suitable in the practice of this invention contain small quantities, e.g. 0.1% by weight, of magnesia. The ceramic matrix material may, however, be in the form of a sol in step (i) comprising a dispersion of colloidal particles of the material or a precursor therefor in a liquid medium. An example of a suitable sol is a boehmite sol or an alumina sol prepared by dispersing in water alumina powder made by a vapour phase condensation method such as flame hydrolysis and as described in West German Patent Specification OLS No 2 647 701. By "precursor" is meant a material which is convertible to the ceramic matrix material as such after step (i) has been carried out.

The refractory material is preferably $ZrO_2$ and/or $HfO_2$ since these oxides are known to have the desired property in the context of the present invention of being convertible to a metastable, high temperature form of higher density than a room temperature form. It is possible that a combination of the size of the colloidal particles and the constraining effect of the ceramic matrix helps to ensure that the metastable form predominates in the final product. It has, however, been found very beneficial to include a precursor convertible to a stabiliser for the metastable form in the mixture used in step (i). An example of such a stabiliser is $Y_2O_3$ when a suitable precursor could be a water-soluble yttrium salt such as yttrium nitrate in solution in water as the liquid medium in step (i). The precursor would be converted into the stabiliser during subsequent heat treatment. As an example, the stabiliser may, for example, be present in a proportion of up to 10% by weight in the final product based upon the weight of the refractory material, preferably in the range of 2 to 5%.

The refractory material may, for example, be present in proportions of up to about 20% by weight in the final product though it may be possible, if desired, to use higher proportions. An example of a sol suitable for use in step (i) is the $ZrO_2$ sol prepared as described in UK Patent Specification No. 1 181 794, i.e. by treatment of $Zr(OH)_4$ in acid medium.

When the ceramic matrix material in step (i) is in the form of a sol, the product of step (i) comprises a gel. When the ceramic matrix material is step (i) is not in the form of a sol, the product of step (i) comprises particles of the ceramic matrix material bonded together by a gel of the refractory material. In either case, the known technique of spray drying may be used. In the former case, spray drying gives rise to gel spheres and in the latter case a powder comprising a gel of the refractory material prescursor within which the ceramic material is entrapped.

Step (ii) may, for example, be carried out at a temperature of about 1600° C. when the ceramic matrix material is alumina. Clearly, it must be carried out at a temperature sufficiently high to effect conversion of the refractory material from its room temperature form to its metastable high temperature form.

The invention will now be particularly described by way of example only as follows in Examples 1 to 4. A comparative example, i.e. not an example of the invention, is also included as Example A.

The general procedure comprised carefully mixing aliquots of the following:- an α-alumina slurry of density 1.92/ml, containing 1.28 kg l$^{-1}$ Al$_2$O$_3$ and having an alumina particle size of less than 1 μm.

a zirconia sol prepared as described in UK Patent Specification No. 1 181 794 containing 410 g l$^{-1}$ of ZrO$_2$ and having a NO$_3$$^-$/ZrO$_2$ mole ratio of 1.0;

optionally an yttrium nitrate solution made by dissolving a 99.9% pure grade of Y$_2$O$_3$ in nitric acid to give a solution containing 363 g l$^{-1}$ Y$_2$O$_3$ and having a NO$_3$$^-$/Y mole ratio of 3.0; and a magnesium nitrate solution made by dissolving AR grade Mg(NO$_3$)$_2$.9H$_2$O in water to give a solution containing 81 g l$^{-1}$ MgO.

The aliquots of the alumina slurry and the magnesium nitrate solution were such as to give rise to about 0.1% of MgO relative to the weight of Al$_2$O$_3$.

A number of mixtures of differing composition was prepared and each mixture was spray dried at 3 hr$^{-1}$ on a NIRO Mobile-Minor spray drier using an inlet temperature of 215° C. and an outlet temperature of 80° C. The resulting powder was heat treated at 500° C. to remove most of the volatile content (mainly water and nitrate), and then converted to a sintered product by milling, calcining at below 1200° C., remilling, adding a binder and a lubricant, pressing and firing at about 1600° C. By way of comparison, the heat treating and sintering procedure was carried out on Al$_2$O$_3$ plus 0.1% by weight of magnesium carbonate.

The powders were converted into rectangular bars by pressing at 3 or 4 tons per in$^2$. The strength and toughness of different composition products were measured on bars of dimensions 3.5×3.5×30 mm as the mean of six specimens. Bend strength tests for strength were carried out under three point loading using 30 mm span knife edges on the bars; the direction of application of load was parallel to the original compaction direction. Fracture toughness measurements were also made in three point bend on broken halves from the bend tests that had a sawn central notch of between 15 and 30% of the sample depth cut into the tensile face; a knife edge span of 14 mm was used. Also, the sintered products were examined by X-ray diffraction and it was found that all of the products which contained ZrO$_2$ contained the ZrO$_2$ in the tetragonal form but the products lacking Y$_2$O$_3$ contained appreciable amounts of the unwanted monoclinic form of ZrO$_2$ whereas those having Y$_2$O$_3$ contained much less.

The results are summarised in the table below.

| Example | Composition of Product (wt%) | | | Bend Strength (MPa) | Fracture Toughness (MNm$^{-3/2}$) |
| --- | --- | --- | --- | --- | --- |
| | Al$_2$O$_3$ | ZrO$_2$ | Y$_2$O$_3$ | | |
| A | 99.7 | nil | nil | 334 | 4.83 |
| 1 | balance | 10 | nil | 351 | 6.59 |
| 2 | balance | 10 | 0.54 | 495 | 6.89 |
| 3 | balance | 15 | 0.82 | 523 | 7.27 |
| 4 | balance | 20 | 1.1 | 617 | 7.32 |

The above results show the benefits of additions of tetragonal ZrO$_2$ and show the further benefits that are obtained by inclusion of Y$_2$O$_3$.

I claim:

1. A method of preparing a sintered ceramic material in which a refractory material is present in a metastable, high temperature enantiotropic form in a ceramic matrix, the metastable form having a higher density than its room temperature enantiotropic form, which method comprises the steps of:
   (i) preparing a homogeneous mixture of noncolloidal particulate ceramic matrix material, a sol comprising colloidal particles of a precursor for the refractory material dispersed in a liquid medium, and a precursor convertible during step (iii) below to a stabiliser for the metastable form of the refractory material;
   (ii) spray drying the homogeneous mixture to produce a powder comprising particles of the ceramic matrix material bonded together by a gel of the refractory material; and
   (iii) sintering the powder to give the ceramic material.

2. A method according to claim 1 wherein the ceramic matrix material is alumina and the refractory material is zirconia and/or hafnia.

3. A method according to claim 1 wherein the stabiliser is yttria and the precursor therefor is a water-soluble yttrium salt.

4. A method according to claim 2 wherein the stabiliser is yttria and the precursor therefor is a water-soluble yttrium salt.

5. A method according to claim 3 wherein the proportion of water-soluble salt in the mixture is such that the proportion of yttria in the sintered material is up to 10% by weight of the weight of the refractory material.

* * * * *